March 25, 1941. H. W. HAPMAN 2,235,992
FLIGHT CONVEYER AND ELEVATOR
Filed Nov. 30, 1939 2 Sheets-Sheet 1
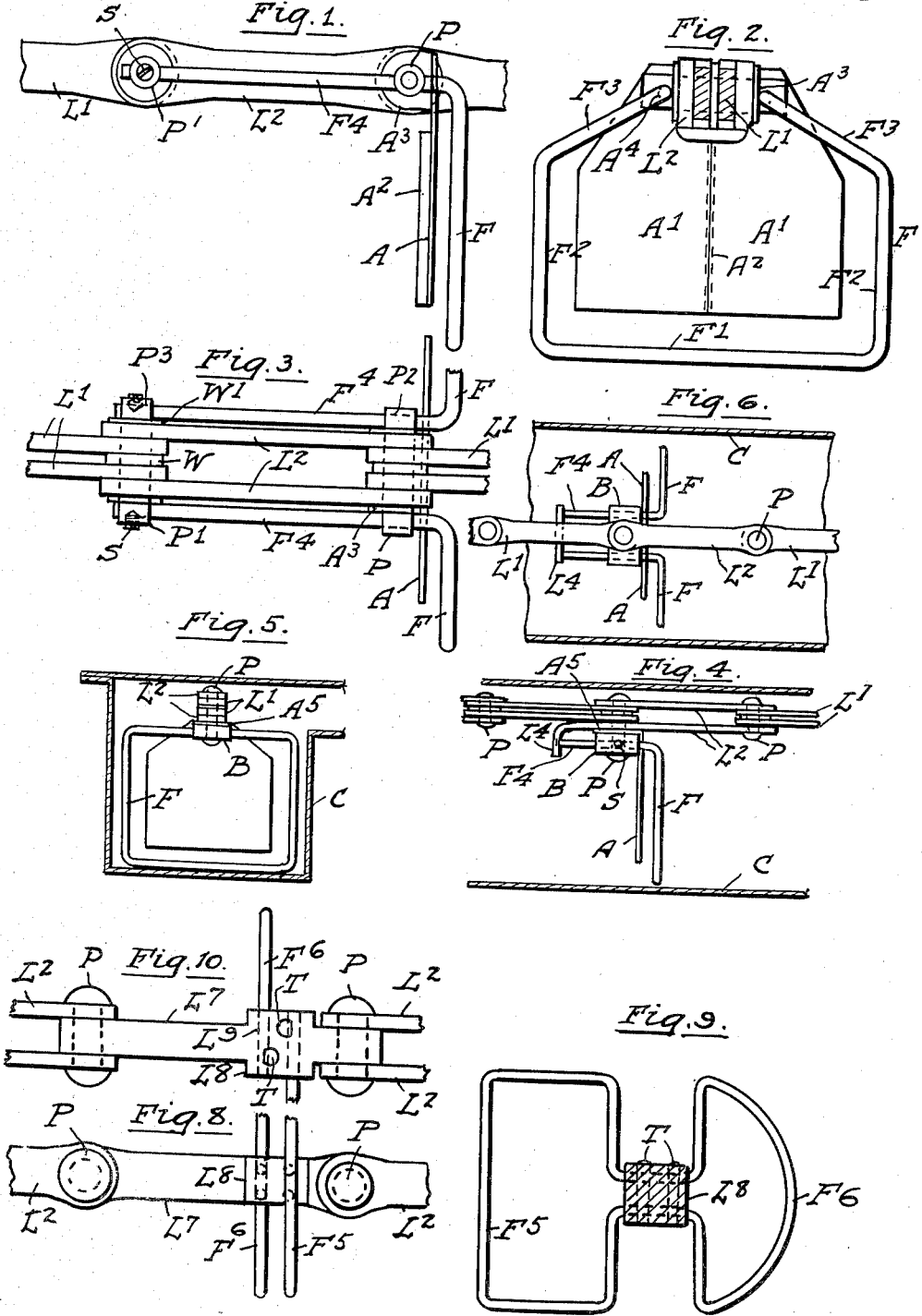

March 25, 1941.  H. W. HAPMAN  2,235,992
FLIGHT CONVEYER AND ELEVATOR
Filed Nov. 30, 1939  2 Sheets-Sheet 2
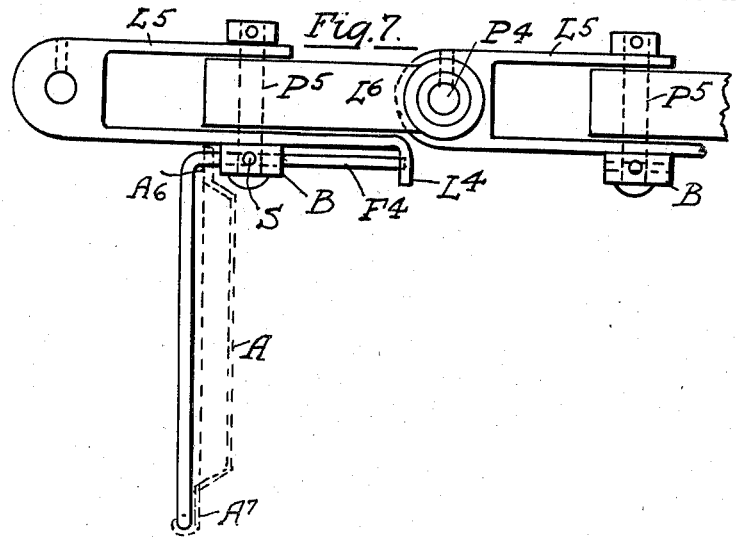
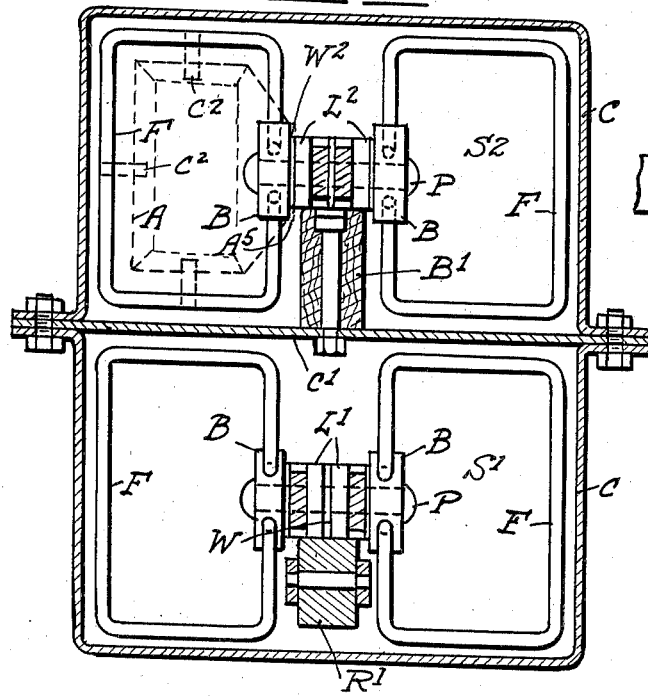
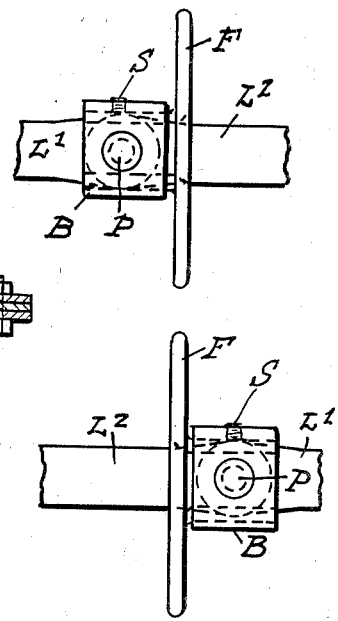
Inventor-
Henry W. Hapman Patented Mar. 25, 1941

2,235,992

UNITED STATES PATENT OFFICE 2,235,992

FLIGHT CONVEYER AND ELEVATOR

Henry W. Hapman, Detroit, Mich.

Application November 30, 1939, Serial No. 306,907

5 Claims. (Cl. 198—172)

This invention relates to flight conveyers and elevators in which flights of the open frame or skeleton type are employed. In this type as at present constructed the flights are usually of cast metal formed integral with the links of the propelling chain and are in consequence very rigidly held, so that when they meet with foreign bodies or other obstructions breakage of the flight or of the chain results, with accompanying delay in production and increased maintenance cost.

A further objection to this construction is due to the excessive weight of the flights, which, being of relatively soft material, wear away rapidly and require frequent renewal. Also, the high ratio of weight of conveyer chain in proportion to that of the material carried necessitates an inordinate amount of power for its operation.

A principal object of the present invention is to provide a skeleton flight which may be made from high carbon alloy steel or from tempered spring steel of commercial round, square or rectangular cross section, which may be bent up to suit any desired shape of conduit or casing. Flights of this type are relatively low in cost, and may be connected to the propelling chain in such manner as to be easily removed and replaced. Further, their light weight and their smooth surface, as well as their relative hardness as compared with that of the casing, will result in much longer life of the flights and reduced operating horsepower. They will also possess a resiliency which will enable them to deflect in passing over minor obstructions and to return to their original shape without damage.

Another object of the invention is to provide means whereby my improved flights may be connected to links of the various commercial chains, which, being produced in large volume, are very much cheaper than the special chains cast integral with the flights according to the present practice.

It is found that when using skeleton flights in conveying or elevating highly comminuted materials, the efficiency of conveyers is greatly reduced, and the maximum height to which such materials can be elevated is limited. It is a further object of my said invention, therefore, to provide means for attaching to the skeleton frame a system of auxiliary flights, considerably less in area than the main flights, which will overcome this difficulty, and enable these particular materials to be elevated to unlimited heights.

With these and other objects in view, I will now describe several embodiments of my invention with reference to the accompanying drawings, in which—

Figure 1 is a fragmentary side elevation showing my improved flight as applied to a section of commercial chain, known as "ice chain," which, being produced in enormous quantities, is the cheapest obtainable having regard to its pitch and working strength.

Figure 2 is an end view of the same partly in section.

Figure 3 is a fragmentary plan view.

Figure 4 is a fragmentary side elevation showing the flight as applied to a section of what is known as a "run-around" conveyer used for transporting material in a horizontal plane.

Figure 5 is an end elevation of the same partly in section.

Figure 6 is a fragmentary plan view of the same.

Figure 7 is a fragmentary side elevation, corresponding to Figure 4, showing the flight as applied to a universal conveyer of the kind described in my prior Patent No. 2,178,342, dated October 31, 1939.

Figure 8 is a fragmentary side elevation showing my improved flights as applied to a chain in which a special form of link is combined with the outer links of standardized chain.

Figure 9 is an end view of the same partly in section.

Figure 10 is a fragmentary plan view of the same.

Figure 11 is a transverse section showing the flights as applied to a conveyer-elevator of the multiple-flight type in which the conveying and return chains operate in a common casing or conduit, and Figure 12 is a fragmentary side elevation showing a section of the chain with the assembled flights in the upper part of Figure 11.

Figure 13 is a similar elevation showing the chain and flight in the lower part of Figure 11.

Like characters designate corresponding parts throughout the several views.

Referring now more particularly to Figures 1, 2 and 3 of the drawings, the chain is made up from alternate pairs of inner and outer links L', L2 respectively, which are connected together by the pivot pins P, P', and between the inner links are washers W. F is the main flight, which is in the present case of a shape suitable for operating in a rectangular casing, and is bent up from a round steel bar. The flight, as shown, has a propelling portion consisting of a base bar F", two side members F2, and two inwardly and upwardly bent members F3, all of these members being usually arranged in a common plane. In continuation of the members F3 are the two rearwardly extending terminal members F4 which pass through openings P2, P3 in the adjacent pivot pins P, P' respectively, the ends of the rods being detachably secured within the openings P3 by suitable means such as the set screws S, which are pointed at their ends to engage conical holes in the rods.

Thus we have a very simple and easily assembled propelling apparatus adapted for handling the ordinary range of materials. When, however, it is required to convey fine materials as above recited, there is provided an auxiliary flight member A, the edges of which are spaced inwardly from the main flight members. This member is made from two plates A' which are connected at their meeting edges by rearwardly bent flanges A2 secured together as by welding or other means.

In order to hold the flight A in position upon the chain there are provided a pair of rearwardly bent lugs A3 having openings through which the pivot pin P passes, and openings A4 through which the terminal members F4 of the main flight pass. A washer W' of the same thickness as the lugs A3 serves as a filler between the terminals and the adjacent faces of the outer links.

Referring now to Figures 4, 5 and 6 of the drawings which show my invention as applied to a conveyer adapted to move materials in a horizontally disposed conduit C, it will be seen that the inner and outer links of the chain lie flat, instead of standing up edgewise as in the modification just described, and the pivot pin P is vertical. Upon the underside of the chain, and secured thereto by the pin P, is a metal block B which is provided with openings to receive the horizontal members F4 which are held therein as by set screws S. The extreme ends of the members F4 are further supported in dead-end holes in a downwardly extended portion L4 of the lower link, as shown in Figure 4 of the drawings.

An auxiliary flight A, formed from sheet metal, has a horizontal lug A5 through which the pin P passes. The pins P are secured in position by means of integral heads formed by riveting or other means.

In Figure 7, which shows a portion of the chain described in my prior patent as above referred to, it will be observed that the pivot pins of the chain are alternately horizontal as at P4 and vertical as at P5, and the alternate links L5, L6 are also arranged at right angles one to the other so that the chain is capable of bending in both vertical and horizontal planes. Upon the pin P5 is a block B having openings adapted to receive the horizontal portions F4 of the flight F, and these portions extend rearwardly and terminate within dead-end holes in a downwardly extended portion L4 of the adjacent link. In this case set screws S serve to retain the portions in position in the block B in the same manner as shown in Figure 4 of the drawings. An auxiliary flight A shown in dotted lines is secured to the main flight members as at A6, A7 by any convenient means.

In Figures 8, 9, and 10 of the drawings there is shown a chain formed from standard outer links L2 which alternate with a one piece cast center link L7, the links being connected together by pins P having riveted-over heads as shown in Figure 10. The link L7 has a boss L8 in which are openings L9 adapted to receive the free ends of the flight F, the said ends being secured in position by taper pins T. In the end view, Figure 9, the flights F5 are shown as of rectangular shape, and when both sides are this shape the conveyer would be adapted to work within a rectangular casing, whereas in order to work within a cylindrical casing or pipe, the flights would be curved on their outer sides as indicated at F6.

Figures 11 and 12 of the drawings show a transverse section and a fragmentary side elevation, respectively, showing the application of my invention to a conveyer-elevator in which is employed a rectangular casing C divided by a central partition C' so as to provide separate spaces for the conveying and return sections S', S2, respectively, of the conveyer chain. The chain is made up from links L', L2 having centrally disposed washers W as previously described, and upon the outer ends of the pins P are metal blocks B having openings to receive the ends of the flight members which are secured in position by set screws S as previously described with reference to Figure 4 of the drawings. Intermediate the blocks and the outer links of the chain are washers W2 so as to provide increased clearance between the adjacent sides of the flights.

It will be noted that in this construction the chain and the attached flights float in the casing which is filled with the stream of material being moved, so that no guides are required for the chain except at turning points, at which points I prefer in general to employ rollers R' shown in section in Figure 11. The empty or return sections of the chain with the attached flights can also operate without guides when travelling vertically, and upon horizontal runs I may employ guides such as the wood stringers B' secured to the partition C' as shown in section in Figure 11.

Where the characteristics of the material so require, I may also use auxiliary flights A similar to those previously described with reference to other modifications. These flights may be either flat as shown in Figure 5, or dished as shown in Figure 7. In the upper left hand corner of Figure 11 is shown an auxiliary flight of the dished type which is connected to the chain by a bent-over flange A5 through which the pin P passes and is further supported by welded or other clips C2 which connect it to the main flights.

It will be observed from the foregoing description and by reference to the drawings that I have provided a novel construction which is adapted for use with all types of flight conveyers, which is light in weight, simple in construction, and economical to manufacture, and which fulfills all the conditions recited in the preamble hereof; and while I have herein described and shown preferred modifications of my said invention, it will be readily understood by those skilled in the art to which the same pertains that various changes in detail may be made to suit particular or peculiar requirements, without departing from the spirit of my invention as defined in the appended claims.

Having thus described my said invention, what I claim and desire to secure by Letters Patent of the United States is:

1. In a flight conveyer, the combination, with a conduit arranged to follow a desired circuit; of a chain comprising alternate pairs of inner and outer links connected by transverse pivot pins; a series of flights formed from bar material bent to conform substantially to the interior surface of said conduit; and means for securing said flights upon said chain, said means comprising pairs of aligned openings in the outer ends of said pins; integral right-angle extensions upon said flights received in said openings; and means for detachably securing said extensions in position within said openings.

2. In a flight conveyer, the combination, with a chain having main flights of the character described in claim 1, of a series of auxiliary flights of plate construction having their marginal edges spaced inwardly from said main flights; and means for securing said auxiliary flights to said main flights.

3. In a flight conveyer, the combination, with a conduit arranged to follow a desired circuit; of a chain comprising alternate pairs of inner and outer links connected by transverse pivot pins; a series of main flights formed from bar material bent to conform substantially to the interior surface of said conduit and having right-angle extensions passing through aligned openings in said pivot pins; and a series of auxiliary flights of plate construction having their marginal edges spaced inwardly from said main flights and having integral lugs with openings adapted to fit over said pins intermediate said outer links and said extensions.

4. In a flight conveyer, the combination, with a conduit arranged to follow a desired circuit; of a chain comprising alternate pairs of inner and outer links connected by transverse pivot pins; a series of main flights formed from bar material bent to conform substantially to the interior surface of said conduit and having right-angle extensions passing through aligned openings in said pivot pins; and a series of auxiliary flights of plate construction having their marginal edges spaced inwardly from said main flights and having integral lugs with openings adapted to fit over said pins intermediate said outer links and said extensions, there being openings in said auxiliary flights through which said extensions pass.

5. In a flight conveyer, the combination, with a conduit arranged to follow a desired circuit, of a flexible propelling member passing through said conduit and having appropriate driving means, a series of main flights formed from bar material bent to conform substantially to the interior surface of said conduit and to propel material therealong, a series of auxiliary flights of plate construction having their marginal edges spaced inwardly from said main flights, and means for securing said respective flights upon said propelling member.

HENRY W. HAPMAN.